United States Patent [19]

Kawakami et al.

[11] Patent Number: 5,601,001

[45] Date of Patent: Feb. 11, 1997

[54] SPEED INDICATOR FOR A BICYCLE

[75] Inventors: Tatsuya Kawakami; Hitoshi Kishimoto, both of Sakai, Japan

[73] Assignee: Shimano, Inc., Sakai, Japan

[21] Appl. No.: 551,696

[22] Filed: Nov. 1, 1995

Related U.S. Application Data

[63] Continuation of Ser. No. 205,413, Mar. 3, 1994, abandoned.

[30] Foreign Application Priority Data

Mar. 9, 1993 [JP] Japan .................................... 5-009785

[51] Int. Cl.$^6$ .................................................. B62M 25/04
[52] U.S. Cl. .......................... 74/502.2; 74/489; 116/28.1; 116/309
[58] Field of Search .................................... 74/502.2, 489, 74/475; 116/28.1, 309, 313, 319, 328, 331, 332

[56] References Cited

U.S. PATENT DOCUMENTS

| | | | |
|---|---|---|---|
| 3,383,940 | 5/1968 | Brilando et al. ........................ | 74/502.2 |
| 3,524,979 | 8/1970 | Cohen ................................. | 74/489 X |
| 3,633,437 | 11/1972 | Ishida ................................. | 74/489 |
| 4,270,481 | 6/1981 | Watarai ............................... | 116/28.1 |
| 4,768,395 | 9/1988 | Tasawa ................................ | 74/489 |
| 5,052,241 | 10/1991 | Nagano ............................... | 74/502.2 |
| 5,325,735 | 7/1994 | Nagano ............................... | 74/502.2 |

*Primary Examiner*—Richard M. Lorence
*Attorney, Agent, or Firm*—Dickstein Shapiro Morin & Oshinsky LLP

[57] ABSTRACT

A speed indicator includes a stationary member fixed to a handlebar of a bicycle, a takeup element supported by the stationary member to be rotatable about a first axis for taking up a control cable, a shift lever for rotating the takeup element, and a pointer pivotable about a second axis fixed to the stationary member. The pointer overlaps the takeup element as viewed in a direction along the first axis. The speed indicator further includes an indicating section for cooperating with the pointer for indicating a speed stage selected by operation of the shift lever. The takeup element has a projection engaged with a slot formed in the pointer for causing the pointer to pivot in response to rotation of the takeup element.

6 Claims, 3 Drawing Sheets

SPEED INDICATOR FOR A BICYCLE

This application is a continuation of application Ser. No. 08/205,413, filed Mar. 3, 1994, now abandoned.

BACKGROUND OF THE INVENTION

1. Field of the Invention

The present invention relates to a speed indicator for a shifting device of a bicycle having a plurality of speed stages.

2. Description of the Related Art

A conventional shifting device includes a disk forming a takeup element for winding a speed control cable, and this disk has an arrow acting as a pointer. When a shifting operation is carried out, the arrow is swung to indicate a selected speed stage.

In such a conventional shifting device, the pointer is attached to the takeup element to be operable therewith. When, for example, the shifting device is reduced in size, the takeup element has a reduced outer configuration. Then, even when the takeup element rotates from a minimum speed stage to a maximum speed stage, the pointer is operable only through a very short stroke. This results in an inconvenience that speed indicating marks must be arranged at slight intervals along a moving track of the pointer.

Further, in certain types of shifting device, the takeup element must have different angles of rotation, such that the takeup element is rotatable through different angles for shifting from a first speed stage to a second speed stage and for shifting from the second speed stage to a third speed stage. In such a case, the pointer also is movable through different angles, which results in an inconvenience of having to arrange the speed indicating marks at varied intervals along the moving track of the pointer.

SUMMARY OF THE INVENTION

An object of the present invention is to provide a speed indicator having a simple construction to indicate rotational displacements of a takeup element in an amplified manner, while allowing a reduction in size of the device.

It is another object of the invention to provide a speed indicator which enables speed indicating marks to be arranged equidistantly as necessary, even if a takeup element is rotatable through different angles for establishing different speed stages.

The above objects are fulfilled, according to the present invention, by a speed indicator comprising a stationary member fixed to a handlebar of a bicycle, a takeup element supported by the stationary member to be rotatable about a first axis for taking up a control cable, a shift lever for rotating the takeup element, and a first indicating device pivotable about a second axis fixed to the stationary member. The first indicating device overlaps the takeup element as viewed in a direction along the first axis. The speed indicator further comprises a second indicating device for cooperating with the first indicating device to indicate a speed stage selected by operation of the shift lever, and an interlock device for interlocking the first indicating device and takeup element to enable the first indicating device to pivot in response to rotation of the takeup element.

In the above construction, the first indicating device such as a pointer is interlocked to the takeup element, but is pivotally supported by an axis different from a rotational axis of the takeup element. Moreover, the first indicating device is in an overlapping relationship with the takeup element. Consequently, rotational displacements of the takeup element may be amplified without enlarging the entire apparatus.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

A speed indicator according to the present invention will be described hereinafter with reference to the drawings.

Figure 1:
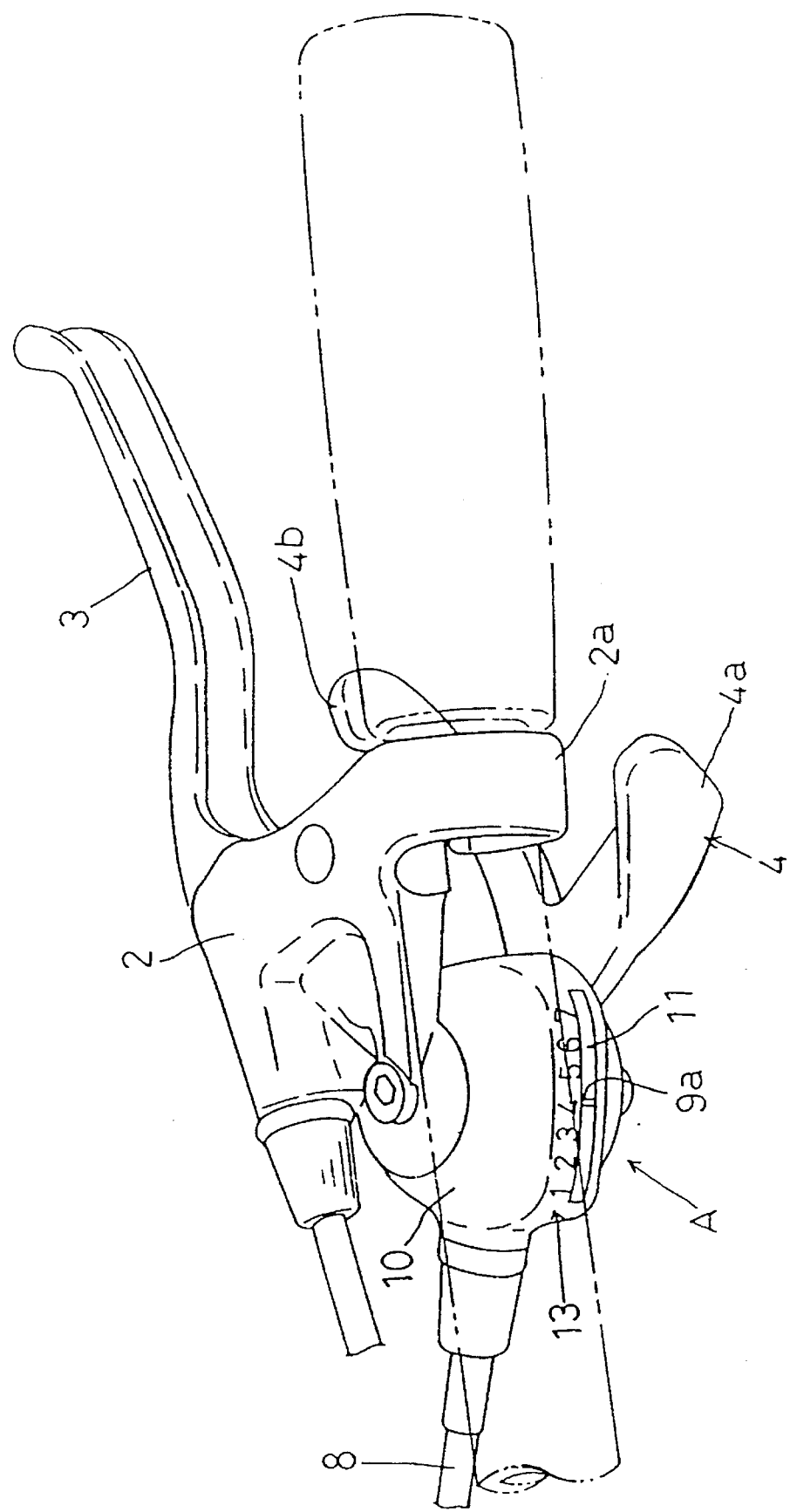
FIG. 1 is a perspective view of a shifting device having a speed indicator according to the present invention.

As shown in FIG. 1, a lever bracket 2 pivotably supports a brake lever 3. The lever bracket 2 also supports a shifting device including a shift lever 4 and a speed indicator A.

The shifting device will particularly be described with reference to FIG. 2. A stationary member 5 is fixed to a support portion 2a of the lever bracket 2. The stationary member 5 supports a takeup element 7 to be rotatable on a support shaft 6 for taking up an inner wire 8a of a control cable 8. The shift lever 4 (FIG. 3) also is attached to the support shaft 6 to be pivotable about an axis X acting as a first axis. In this embodiment, as seen from FIG. 3, the shift lever 4 has a Y-shaped overall configuration including a first control portion 4a and a second control portion 4b. The takeup element 7 is biased in an unwinding direction by a biasing spring included in a derailleur not shown.

Figure 3:
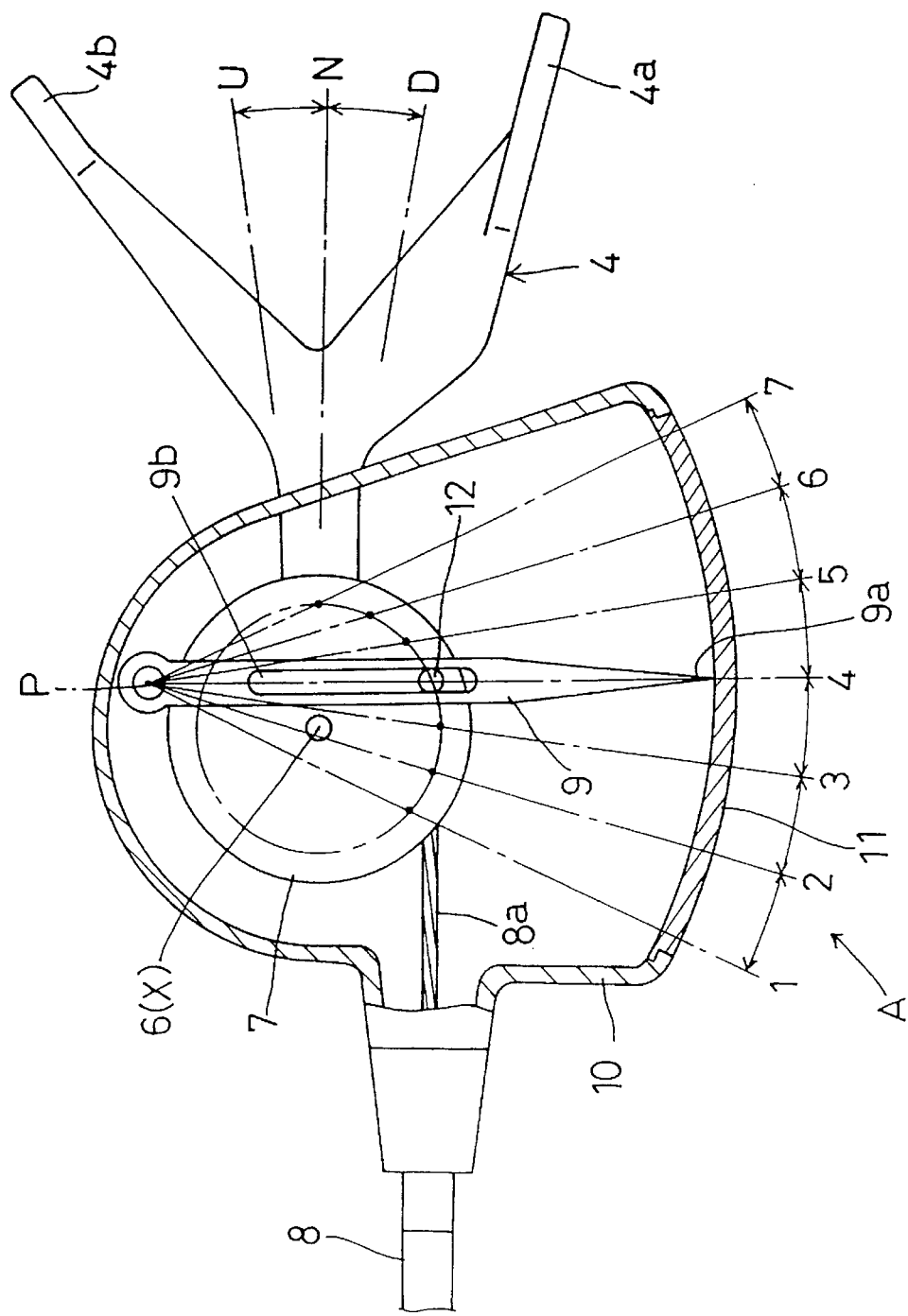
FIG. 3 is a sectional view of a principal portion of the speed indicator.

When the rider operates the shift lever 4 by means of the first control portion 4a or second control portion 4b, the takeup element 7 is rotated through a control mechanism, not shown, to wind or unwind the inner wire 8a of the control cable 8. As shown in FIG. 3, the shift lever 4 is pivotable from home position N to a first shift position U to rotate the takeup element 7 counterclockwise in FIG. 3. As a result, the inner wire 8a is wound on the takeup element 7 to effect a shift by one stage. When the shift lever 4 is released after this shifting operation, the shift lever 4 returns to the home position N under the biasing force of a return spring. This operation is repeated to effect a further shift.

For unwinding the wire, the shift lever 4 is operated to a second shift position D. As a result, the takeup element 7 is rotated clockwise in FIG. 3, allowing the inner wire 8a to be drawn from the takeup element 7. In this case also, the operation of the shift lever 4 to the second shift position D effects a shift by one stage. After this operation, the shift lever 4 may be returned to the home position N under a biasing force.

To enable the foregoing functions, the shifting device in this embodiment includes a feed pawl, a return pawl and a stopper pawl of the ratchet type (none of these pawls being shown in the drawings). Specifically, when the shift lever 4 is operated from home position N to first shift position U, the feed pawl engages the takeup element 7 to transmit an operating force to rotate the takeup element 7 to a position corresponding to a new speed stage. During the pivotal movement of the shift lever 4 from home position N to first shift position U, the stopper pawl is automatically held in an inoperative position by the control mechanism. Once the shift lever 4 reaches the first shift position U, placing the takeup element 7 in the position corresponding to the new speed stage, the control mechanism actuates the stopper pawl to maintain the takeup element 7 in that new speed stage position. When the shift lever 4 returns from first shift position U to home position N under the biasing force, the feed pawl is automatically disengaged from the takeup element 7. Then the takeup element 7 is retained in the new speed stage position by the stopper pawl.

Similarly, when the shift lever 4 is operated from home position N to second shift position D, the return pawl engages the takeup element 7 to transmit an operating force to rotate the takeup element 7 to a position corresponding to a new speed stage. During the pivotal movement of the shift lever 4 from home position N to second shift position D, the stopper pawl is automatically held in the inoperative position by the control mechanism. Once the shift lever 4 reaches the second shift position D, placing the takeup element 7 in the position corresponding to the new speed stage, the control mechanism actuates the stopper pawl to maintain the takeup element 7 in that new speed stage position. When the shift lever 4 returns from second shift position D to home position N under the biasing force, the return pawl is automatically disengaged from the takeup element 7. Then the takeup element 7 is retained in the new speed stage position by the stopper pawl.

The speed indicator A according to the present invention will be described next. As shown in FIG. 2, the stationary member 5 has an axis P fixed thereto to act as a second axis extending substantially parallel to the rotational axis X of the takeup element 7. A pointer 9 is pivotably supported by this axis P to act as a first indicating device. The stationary member 5 further supports a housing 10 for accommodating the takeup element 7, the control mechanism and so on. The housing 10 includes a transparent plate 11 to render the pointer 9 visible from outside the housing 10, and a speed scale panel 10a acting as a second indicating device to indicate speed stages in cooperation with the pointer 9. As viewed in a direction along the axis X, the speed scale panel 10a is disposed in a position substantially opposite to the axis P across the takeup element 7.

Figure 2:
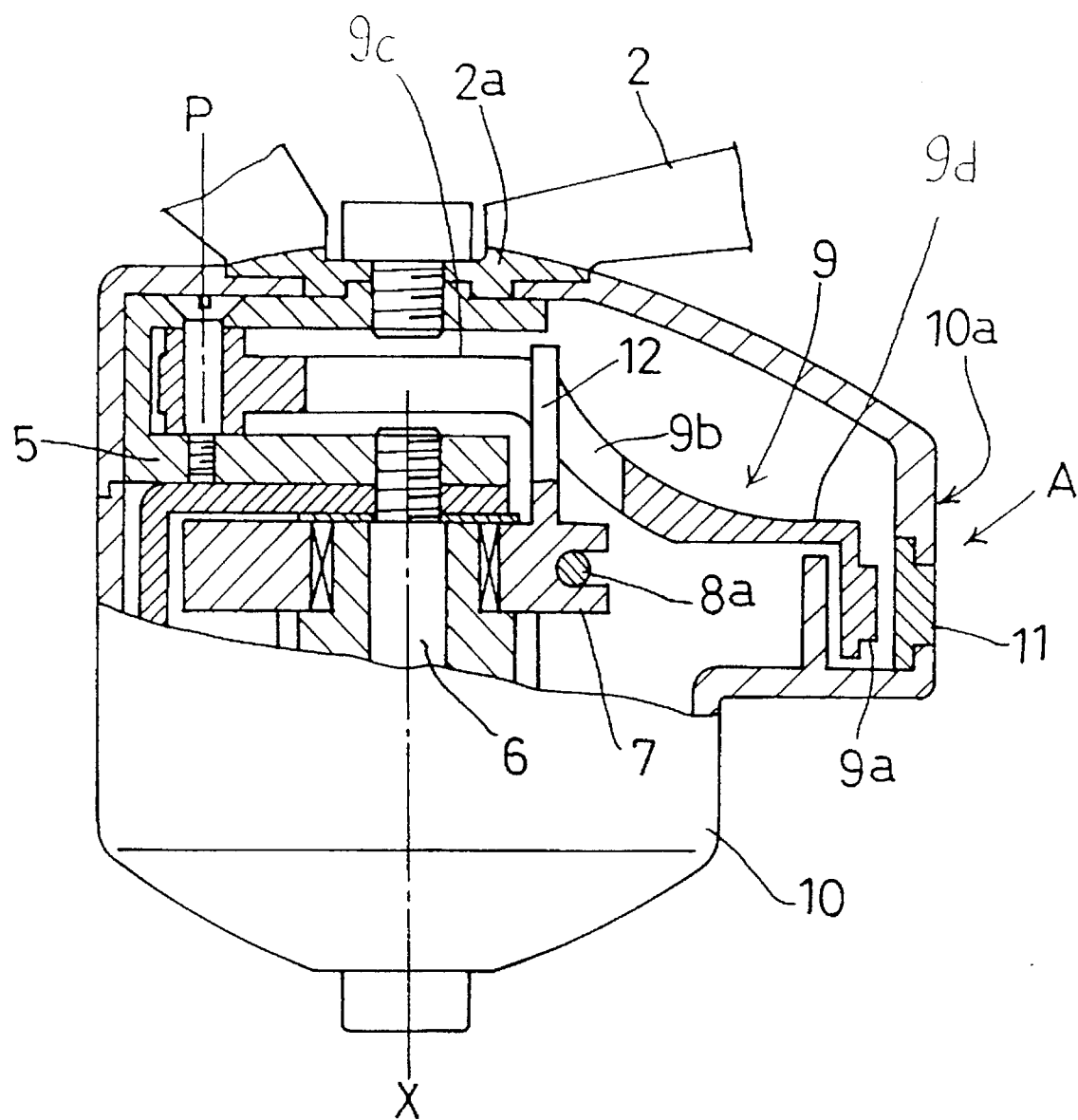
FIG. 2 is a sectional view taken along a pivotal axis of control levers of the shifting device of FIG. 1.

As shown in FIGS. 2 and 3, a projection 12 is formed on an upper surface in a peripheral region of the takeup element 7. The projection 12 has a free end thereof extending through a slot 9b formed in the pointer 9. As shown in FIG. 3, the slot 9b extends substantially longitudinally of the pointer 9 between the pivotal axis P and a distal end portion 9a of the pointer 9. As viewed in a direction perpendicular to the axis X (FIG. 2), the pointer 9 includes a horizontal portion 9c extending substantially horizontally from the pivotal axis P, an intermediate portion 9d sloping generally downward from the horizontal portion 9c and then extending horizontally, and the distal end portion 9a extending substantially vertically from the intermediate portion 9d.

Thus, when the takeup element 7 is rotated in a shifting operation, the projection 12 extending through the slot 9b pushes the pointer 9 while sliding relative thereto. As a result, the pointer 9 pivots about the axis P, with the distal end portion 9a of the pointer 9 moving along an inner surface of the transparent plate 11. When the takeup element 7 stops rotating, the pointer 9 stops at a selected indicating position. At this time, the distal end portion 9a of the pointer 9 points at one of a plurality of marks or numerals 13 shown on the speed scale panel 10a, which numeral corresponds to a speed stage for which the takeup element 7 has been rotated and stopped.

As shown in FIG. 3, the pivotal axis P of the pointer 9 is located adjacent a peripheral region of the takeup element 7 and substantially opposite to the distal end portion 9a and transparent plate 11 across the rotational axis X. That is, as viewed in a direction along the rotational axis X, the pointer 9 is disposed in a constantly overlapping relationship with the takeup element 7. In this embodiment, seven speed stages are provided. When the takeup element 7 lies in a position corresponding to the fourth speed stage which is the middle stage among the seven stages, a straight line extending from the axis P through the projection 12 to the distal end portion 9a is offset from the rotational axis X of the takeup element 7. In FIG. 3, the distal end portion 9a points at the fourth speed stage. In this state, the pointer 9 does not lie on the rotational axis X. That is, the pivotal axis P and projection 12 are arranged asymmetrically about the axis X. With this arrangement, even if the takeup element 7 has unequal angles of rotation, e.g. larger angles for low speed stages than for high speed stages, the distal end portion 9a of the pointer 9 is movable through substantially the same intervals to facilitate visual presentation of the speed stages. For enabling the distal end portion 9a to move through substantially the same intervals as above, it is necessary to take two points into account. One of these points is a relationship between a distance by which the takeup element 7 rotates to shift from one speed stage to a next adjacent speed stage, and an angle by which the pointer 9 pivots in accordance with that distance. The other point is a ratio between a distance from the pivotal axis P to the projection 12, and a distance from the projection 12 to the distal end portion 9a. The larger this ratio is, the movement of the distal end portion 9a is amplified to the greater extent even if the pointer 9 pivots through a small angle about the pivotal axis P. By suitably balancing the two relationships, the distal end portion 9a is allowed to move through substantially the same intervals.

Other embodiments of the present invention will be described next.

In the foregoing embodiment, the pivotal axis P of the pointer 9 extends substantially parallel to the rotational axis X of the takeup element 7. Such a construction allows the entire pointer 9 to be disposed close to the takeup element 7, and hence an advantage of enabling the shifting device to be compact. However, it is not essential for the pivotal axis P of the pointer 9 to be parallel to the rotational axis X of the takeup element 7.

In the foregoing embodiment, the pointer 9 is operable in response to the takeup element 7. It is possible, however, to fix the pointer to a stationary member, with the speed scale panel interlocked to the takeup element.

In the foregoing embodiment, the projection 12 is formed on the takeup element 7. Instead, the projection may be formed on the pointer, with the takeup element defining a bore for engaging the projection. The slot for engaging the projection may be curved instead of being linear. The nonlinear slot should preferably be shaped to enable the indicating device to move substantially constant amounts even when the takeup element rotates through different angles to establish different speed stages.

The present invention is applicable also to other types of shifting devices than the described shifting device in which the shift lever is returned to home position after each shifting operation. Such other shifting devices include one in which a shift lever is connected to a takeup element such that the shift lever and takeup element may be stopped together at a selected speed position.

What is claimed is:

1. An indicating apparatus for a shift controller for use with a bicycle having a plurality of speed stages, comprising:
   a stationary member;
   a takeup element supported by said stationary member to be rotatable about a first axis for taking up a control cable;
   a shift lever for rotating said takeup element;
   a pointer pivotable about a second axis fixed to said stationary member, said pointer overlapping said takeup element as viewed in a direction along said first axis;
   an indicating section for cooperating with said pointer to indicate one of said speed stages selected by operation of said shift lever; and
   interlock means for interlocking said pointer and said takeup element to pivot said pointer in response to rotation of said takeup element, wherein said interlock means includes a projection and an engaging portion for receiving said projection provided between said pointer and said takeup means.

2. An indicating apparatus as defined in claim 1, wherein said projection is formed in a peripheral region of said takeup element.

3. An indicating apparatus as defined in claim 1, wherein said engaging portion is in form of a slot extending longitudinally of said pointer.

4. An indicating apparatus for a shift controller for use with a bicycle having a plurality of speed stages, comprising:
   a stationary member;
   a takeup element supported by said stationary member to be rotatable about a first axis for taking up a control cable;
   a shift lever for rotating said takeup element;
   a pointer pivotable about a second axis fixed to said stationary member and extending substantially parallel to said first axis, said pointer overlapping said takeup element as viewed in a direction along said first axis;
   an indicating section disposed substantially opposite to said second axis as viewed in the direction along said first axis and having marks corresponding to said plurality of speed stages, said indicating section cooperating with said pointer to indicate one of said speed stages selected by operation of said shift lever; and
   a connector disposed between a peripheral region of said takeup element and said pointer for causing said pointer to pivot in response to rotation of said takeup element; including a projection fixedly formed on said takeup element and a slot formed in said pointer for receiving said projection.

5. An indicating apparatus for a shift controller for use with a bicycle having a plurality of stages, comprising:
   a stationary member;
   a takeup element supported by said stationary member to be rotatable about a first axis for taking up a control cable;
   a shift lever for rotating said takeup element;
   a pointer pivotable about a second axis fixed to said stationary member, including a horizontal portion extending substantially horizontally from said second axis, and a tapered intermediate portion extending from said horizontal portion, said pointer overlapping said takeup element as viewed in a direction along said first axis;
   an indicating section for cooperating with said pointer to indicate one of said speed stages selected by operation of said shift lever; and
   interlock means for interlocking said pointer and said takeup element to pivot said pointer in response to rotation of said takeup element.

6. An indicating apparatus as defined in claim 5, wherein said pointer further includes a distal end portion extending from said intermediate portion.

\* \* \* \* \*